April 29, 1952 L. E. MYTLING 2,594,975
MIXING APPARATUS
Filed May 24, 1949 6 Sheets-Sheet 1

Fig.1

INVENTOR.
LAURITZ EMIL MYLTING.
BY
Richey Watts
ATTORNEYS.

INVENTOR.
LAURITZ EMIL MYLTING.
BY
Richey & Watts
ATTORNEYS.

April 29, 1952 L. E. MYTLING 2,594,975
MIXING APPARATUS
Filed May 24, 1949 6 Sheets-Sheet 5

Fig. 5

INVENTOR.
LAURITZ EMIL MYLTING.
BY
Richey & Watts
ATTORNEYS.

Fig. 6

Patented Apr. 29, 1952

2,594,975

UNITED STATES PATENT OFFICE 2,594,975

MIXING APPARATUS

Lauritz Emil Mylting, Merchantville, N. J., assignor to The Allen-Sherman-Hoff Company, Philadelphia, Pa., a corporation of Pennsylvania Application May 24, 1949, Serial No. 95,047

12 Claims. (Cl. 259—18)

This invention relates to a method and apparatus for thoroughly mixing dust, ash, or other powders with a liquid and automatically maintaining a predetermined proportion of dust to liquid. More particularly, this invention relates to a method and apparatus for automatically mixing properly proportioned batches of dust and water.

In various industries, fine impalpable dust is produced incident to a particular process or operation being carried out, and such dust cannot be conveniently handled, conveyed, or introduced into a following process until it is mixed with a liquid such as water. For example, the fine dust or fly ash precipitated from the furnaces and chimneys of large furnace installations may be readily conditioned for disposal by following the teachings of this invention and a system arranged to condition furnace dust is illustrated as an embodiment of the invention. However, it will be apparent that the invention is not limited to methods and apparatus for conditioning furnace dust, but is applicable to the mixing and conditioning of any type of dust or powder that may be encountered.

One method for disposal of fly ash or furnace dust involves the step of mixing water with the dust so that the mixture may be pumped, caused to flow, or otherwise handled by equipment similar to that normally employed for handling liquids. It has been customary to mix the water and dust continuously by the employment of hydraulic jets, but serious difficulties have been encountered in carrying out prior continuous mixing processes. There is usually an optimum ratio or proportion of dust and water which will produce a readily disposable mixture. If a thoroughly-mixed mixture of these proportions is obtainable by the apparatus, there is no need to incorporate excess water in the mixture. However, with prior systems it has not been possible to rely upon the apparatus to produce consistently a readily disposable mixture having the aforesaid optimum ratio of dust to water. As a result, prior systems must be arranged to mix an excess of water with the dust, which adds to the expense and trouble of handling and disposing of the mixture. Obviously, it is a distinct advantage if the optimum ratio of dust and water can be determined and maintained by the system, particularly if the system is arranged so that the batch is uniformly mixed and so that the desired ratio of dust and water may be readily adjusted. Prior mixing processes have not attained the optimum conditions just described.

I have found, however, that the deficiencies and disadvantages of prior processes are completely overcome by the employment of a batch-mixing operation carried out in accordance with my invention. It is a feature of the present invention that thoroughly mixed batches of predetermined proportions are consistently produced. The dust conditioning operation is carried out in a continuous sequence of what will be termed "cycles," each cycle having two parts or phases. In the first, or mixing phase of a cycle, dust is admitted continuously to the mixing vat, and water is admitted in small increments, automatically measured in the proper proportion to the dust for effective disposal. During the aforesaid phase of incremental addition of water to dust, the aggregate is continuously mixed and agitated by rotation of the vat and by mechanical paddle means. The mixing phase of a cycle is complete after a batch of predetermined total weight containing a predetermined fixed weight of water has been mixed, with which admission of both dust and water is terminated and the mixture is emptied from the mixing vat.

In the preferred embodiment of my invention, the proportioning during the mixing phase of a cycle is accomplished by suspending the mixing vat from a scale beam or poise. The scale beam in effect weighs the dust admitted to the vat but instead of merely indicating the weight of the dust numerically, the scale beam is arranged so that its deflection actuates various relays and electric circuits that control admission of water from a water tank to the vat. Suspended oppositely from the poise is a compensating float resting in and buoyed up by the water in the water tank. Briefly, the system operates as follows: During the mixing phase of a cycle, dust is fed to the vat continuously, and as dust enters the mixing vat, the vat is lowered and the poise moves to energize electric circuits that open the water admission valve to introduce water from the water supply tank to the mixing vat. As water is admitted, the increased weight of the vat is more than compensated for by the decrease in the buoyant affect of the water on the compensating float in the supply tank, so that the float drops and the poise tends to return to its neutral position. When the proper quantity of water for the dust admitted has flowed into the mixing vat the poise returns to its neutral position, and the water release or admission valve closes. This continuous admission of dust, incremental and proportional water admission, and continuous mixing of the batch, is repeated until the predetermined quantity of water has been admitted to and mixed in the vat. At this time all admission of both dust and water to the vat is automatically interrupted and the properly mixed aggregate is automatically emptied from the tank into the hydraulic disposal apparatus.

In the preferred embodiment of the invention a fixed quantity of water is mixed with dust during each cycle and refilling of the tank occurs during the time the mixing vat is being emptied. Another feature of the invention is that in normal operation no dust may be admitted to the vat until the water tank is filled, nor can an operator assume control and initiate dust admission until the tank is filled.

The preferred form of apparatus by which applicant's novel method may be effected may be better understood in the following detailed description thereof and the accompanying drawings, in which.

Figure 1:
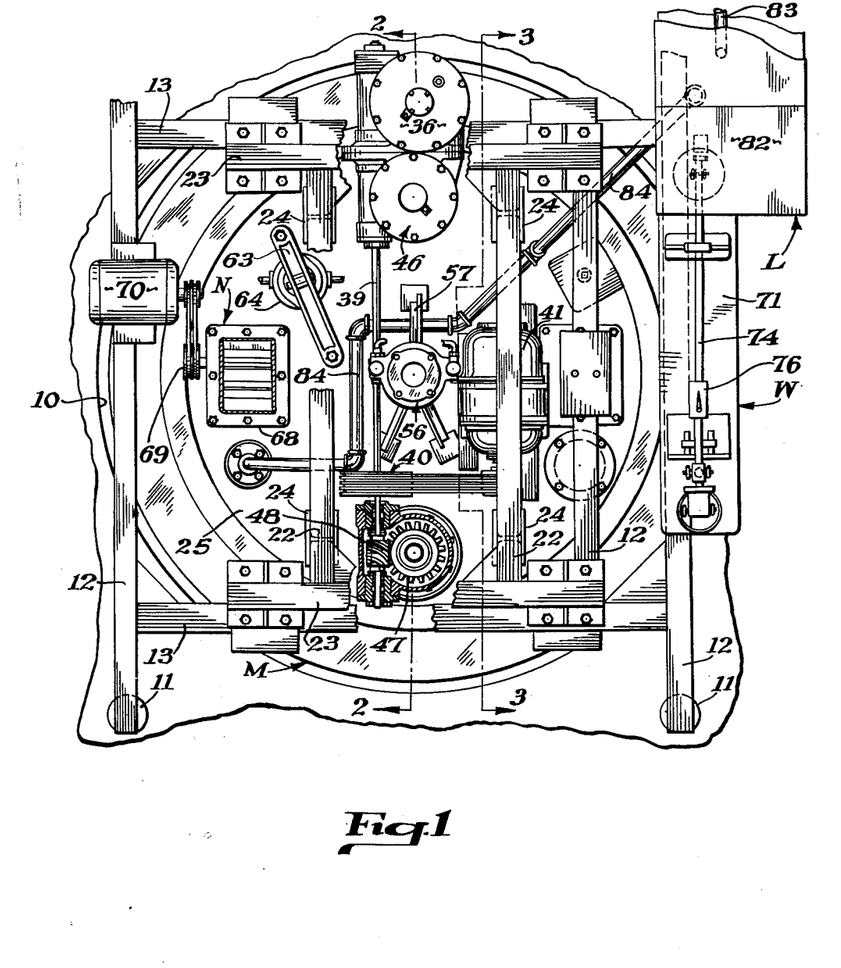
Fig. 1 is a plan view of the dust conditioner.
Figure 2:
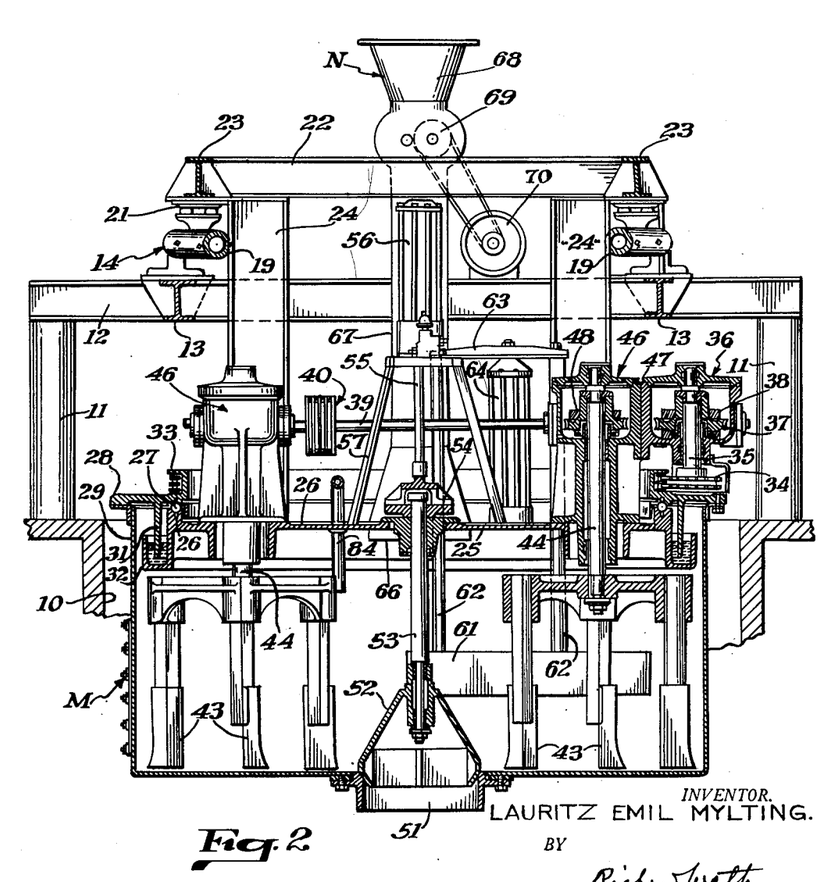
Fig. 2 is a section taken on 2—2 of Fig. 1.
Figure 3:
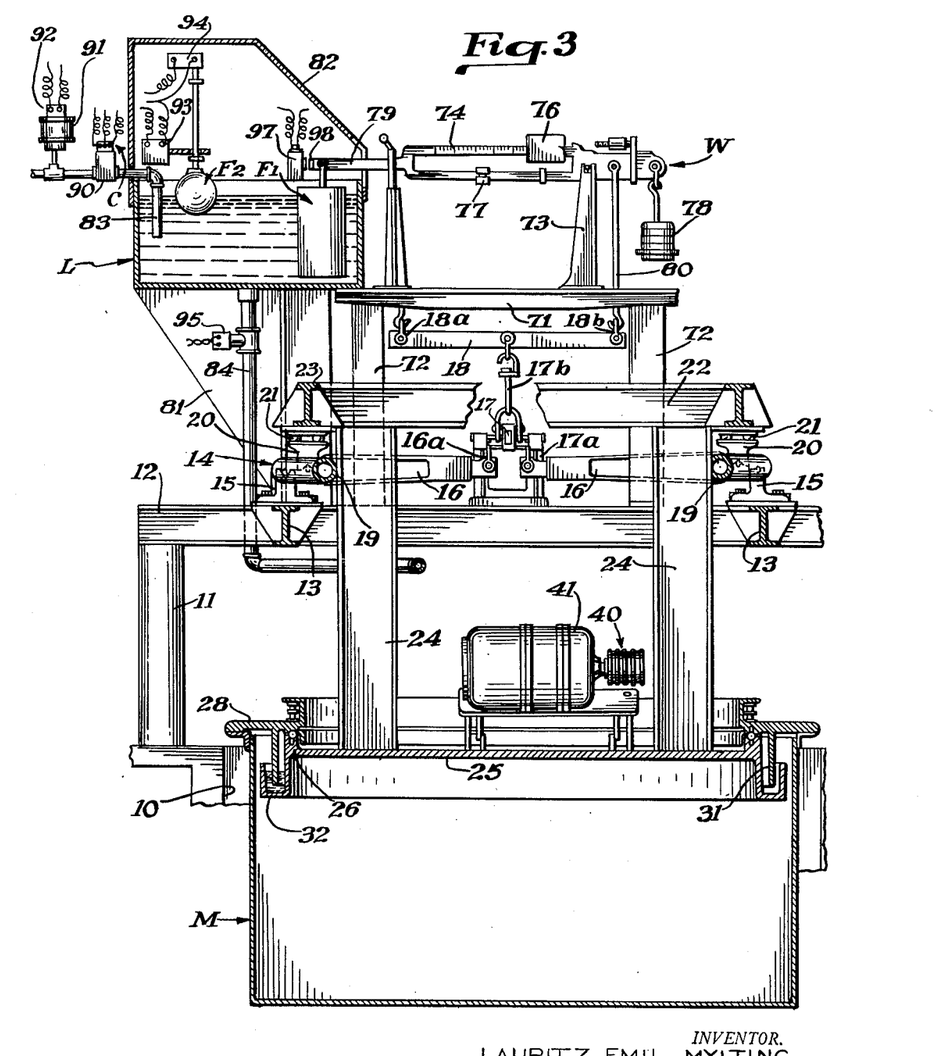
Fig. 3 is a section taken on 3—3 of Fig. 1.

Referring to Figs. 1 to 3 various mechanical details of a preferred embodiment of the invention are shown. The major assemblies include a rotatable mixing vat M, a water supply tank L, dust admission apparatus N, and weighing apparatus W. Also provided are various circuits, valves, and relays that will be described in connection with the diagrams of Figs. 4 to 6.

The entire apparatus is supported over a pit 10 by means of columns 11 and main frame members 12 and 13. The remainder of the apparatus is supported by scale beam lever assembly 14, resting the main frame. This lever assembly comprises four corner base members 15 which support by means of knife edges levers 16. The ends of levers 16 are suspended by hangars 16a from knife edges on a cross-lever 17. The latter lever is supported at one end on knife edges by a standard 17a and the other end is suspended by a rod 17b. Rod 17b is suspended from the center of a cross-beam 18 hung from the platform as at 18a and connected to the weighing mechanism as at 18b. There is a short set of levers (not shown) at the other corners supported on bases 15 and extending only far enough to connect to a rigid crossbar 19. Feet 20 rest on knife edges on levers 16 and on the other short corner levers to support the mixing vat. The aforesaid scale structure is merely one example of typical scale beam structure that may be employed, these structures being well-known in the weighing art, the details of which form no part of the invention. Accordingly, in the interests of clarity, details of the scale assembly are largely omitted from several of the figures.

Balls 21 support a scale-suspended sub-frame comprising beam members 22 and 23 from which depend four arms 24 made fast to the fixed top plate 25 of the mixing vat M.

In order to rotatably mount the mixing vat, top plate 25 has formed thereon a ball race 26 that receives a row of anti-friction balls 27 that rotatably support an annular flange member 28. By means of suitable fasteners the sheet metal mixing tank member 29 is suspended from rotatable flange 28. In order to effect a dust seal between the fixed top plate 25 and the rotating tank and flange assembly, a liquid trough 32 is formed on the top plate 25 into which extends an annular lip 31 depending from the flange 28. Suitable liquid is disposed in the trough and a dust seal is thereby maintained as the vat is rotated.

Means are provided to rotate the vat 29 and continuously stir and agitate its contents. To this end a multiple roller chain 33 is pinned at intervals in a channel integral with flange 28, forming in effect a large ring gear. Meshing with the chain and acting as a drive pinion is the double sprocket 34 driven by shaft 35 rotatably mounted by suitable bearings in a housing 36. In order to turn shaft 35, a worm gear 37 is keyed thereto and driven by a worm 38 mounted on a cross-shaft 39. The drive to the cross-shaft is completed by a multiple V-belt pulley assembly 40 turned by the main drive motor 41.

The agitating and mixing assembly includes a pair of rotatable paddle units, each carrying a plurality of paddles 43. These are fixed to vertical shafts 44 mounted in housings 46 supported on the fixed top plate 25. In order to rotate paddle shafts 44, worm gears 47 are keyed thereto and driven by worms 48 that are also keyed to cross-shaft 39. It can be seen that when the main drive motor 41 is energized, the mixing vat rotates and both sets of paddles rotate within the vat, which provides a thorough stirring and mixing of the vat contents.

Simple and effective apparatus is provided in order to rapidly and completely empty the mixing vat at the end of the mixing part of the cycle. A batch discharge opening 51 is provided at the center of the vat and the opening may be sealed by a closely fitting plug member 52. The plug is carried by a rod 53 which raises and lowers the plug. In the preferred embodiment the plug is raised and lowered by fluid under pressure. To accomplish this, rod 53 is loosely coupled to a coupling 54 which, in turn, may be lifted by the piston rod 55 of a fluid pressure cylinder and piston assembly 56. The cylinder is supported on fixed top plate 25 by means of tripod legs 57.

In order to facilitate and accelerate evacuation of the vat, a scoop or plow 61 is lowered to the bottom of the vat when the plug is raised. The plow is suspended by means of rods 62 from a cross-beam 63, the latter being bolted to the piston rod of a second air cylinder 64. The control valves for the plug and plow air cylinders are synchronized so that when the plug is raised the plow is lowered or vice versa, with which the plow does not interfere with the action of the mixing paddles.

Dust is fed to the tank continuously during the mixing portion of the cycle by a dust admission assembly N. This includes spout 66, shoot 67 and hopper 68; the latter being bolted to the hopper of a dust precipitator or collecting device of suitable construction. The paddles of a feeder of suitable construction are driven by a pulley 69 belted to a feed motor 70. The feed motor is controlled by a circuit that will be described presently.

The balance scale or poise assembly W is mounted on a platform 71 that rests on legs 72 having their footing on beam 12 of the main frame. The essential elements of the scale or poise unit are the knife-edge support 73, the balance arm 74, sliding main and vernier weights 76 and 77, and the coarse adjustment weights 78. An extension 79 of the scale beam suspends a compensating float $F_1$ as well as actuating a magnetic poise switch 97 by means of a magnet 98 carried by the aforesaid extension. Rod 80 extends down from the balance arm and connects to end 18b of crossbeam 18 described previously. The function of the float $F_1$ and the poise switch is to release water from tank L to the vat for mixing with the dust. The poise switch controls a solenoid-operated water release valve 95 disposed in conduit 84 leading from the water tank to the mixing vat, as will best be understood from the description of the electro-mechanical diagram to follow. The tank L for the mixing water is supported on a column member 81 from beam 12 of the main frame, and a cover 82 is provided for the tank. The tank is filled by pipe 83, admission of water to the tank being controlled by a water admission valve 90 and its solenoid C. The arrangement is that water is only admitted to the water tank L during the non-mixing or vat-emptying portion of a cycle. A pressure responsive valve 91 is in the admission conduit and controls contacts 92 that interrupt operation of the system if water pressure is subnormal. The circuits that control admission of water to the water tank are explained in connection with the electro-mechanical diagram.

In order to assure that a tank full of water is available at the beginning of each mixing cycle and to stop the mixing cycle when the tank L is empty, a cycle control float $F_2$ is suspended in the tank and operates lower contacts 93 and upper contacts 94 connected into the control circuit. These contacts are in circuits that stop admission of dust and water to the vat, initiate emptying of the vat and cause refilling of the water tank ready for the next cycle, as explained in connection with the following detailed description of the electro-mechanical diagram.

Figure 4:
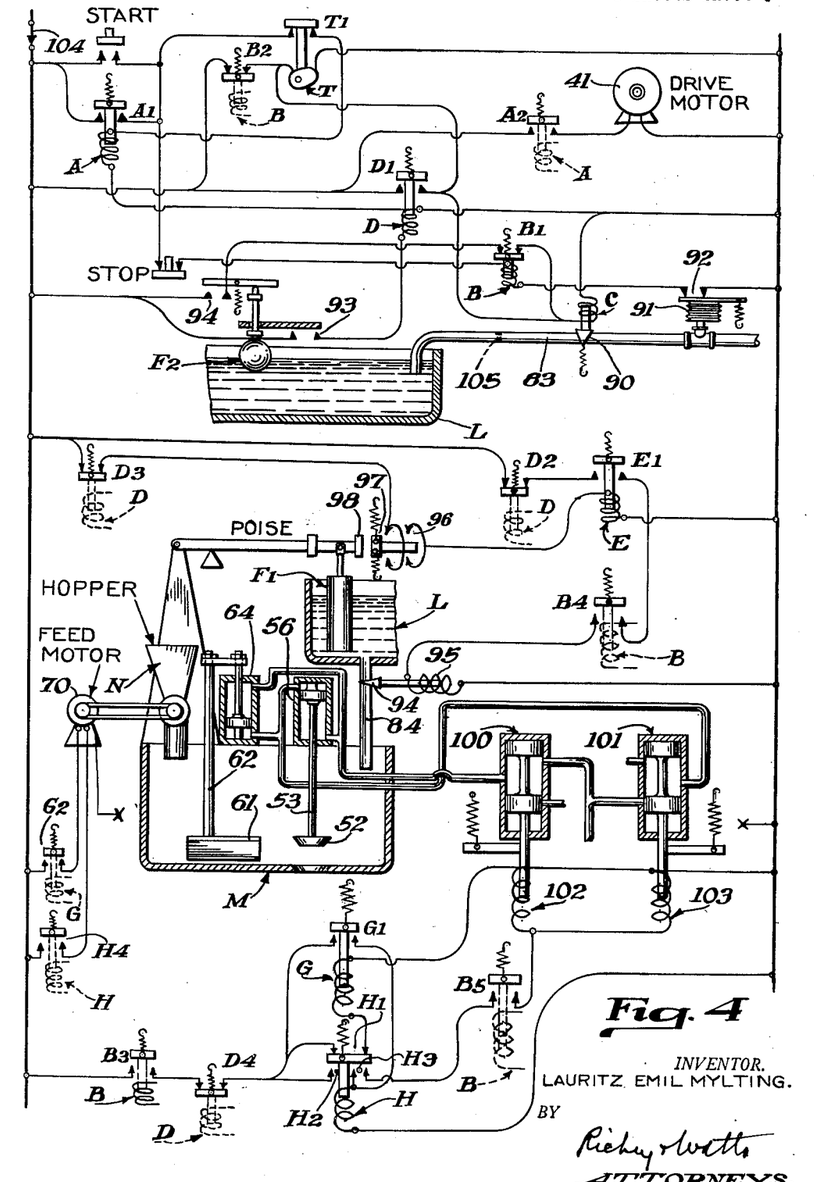
Fig. 4 is a schematic diagram of the system with the circuits de-energized.
Figure 5:
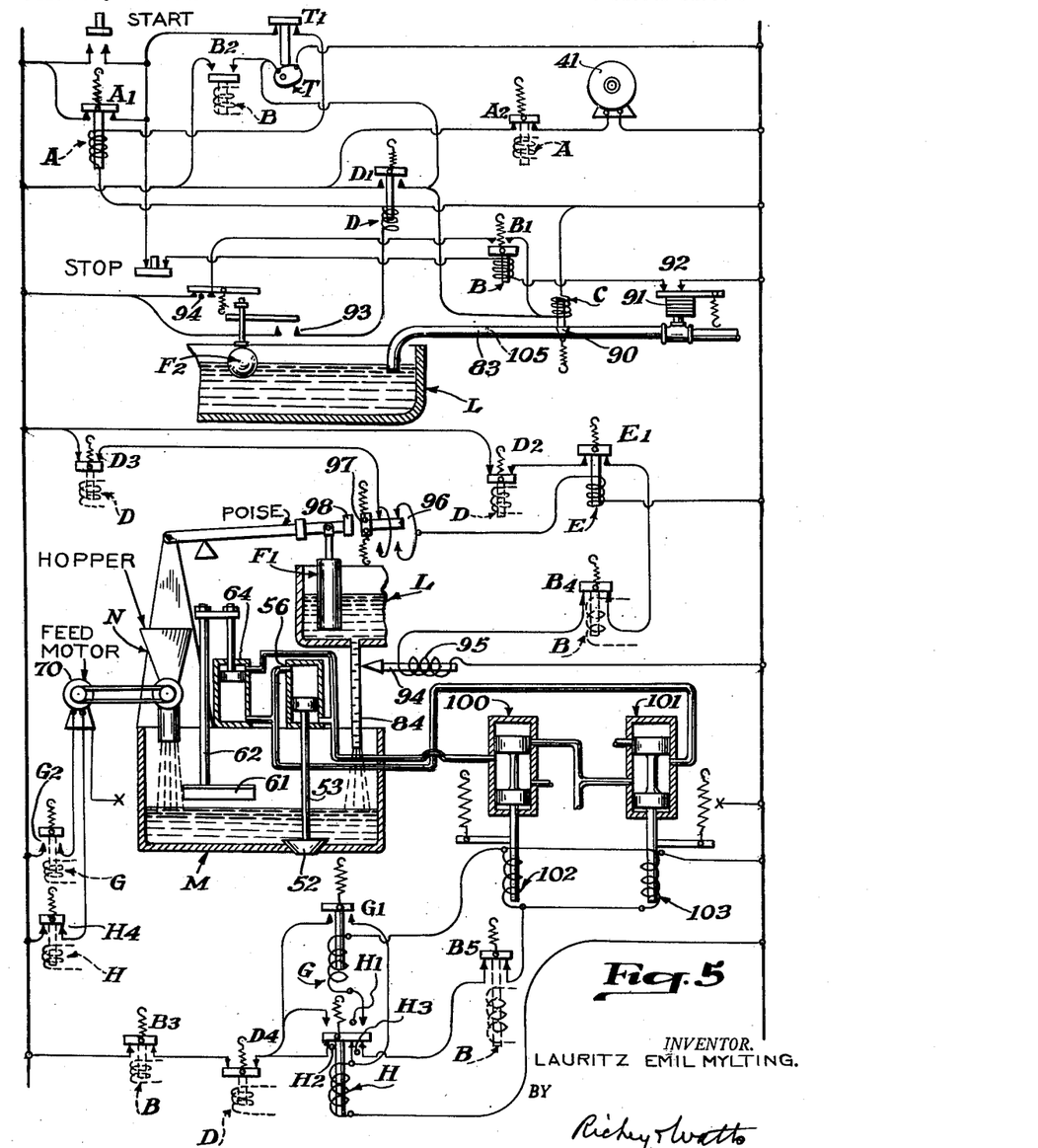
Fig. 5 shows the circuits during the mixing phase of a cycle; and,
Fig. 6 shows the circuits during the discharge phase of a cycle.
Figure 6:
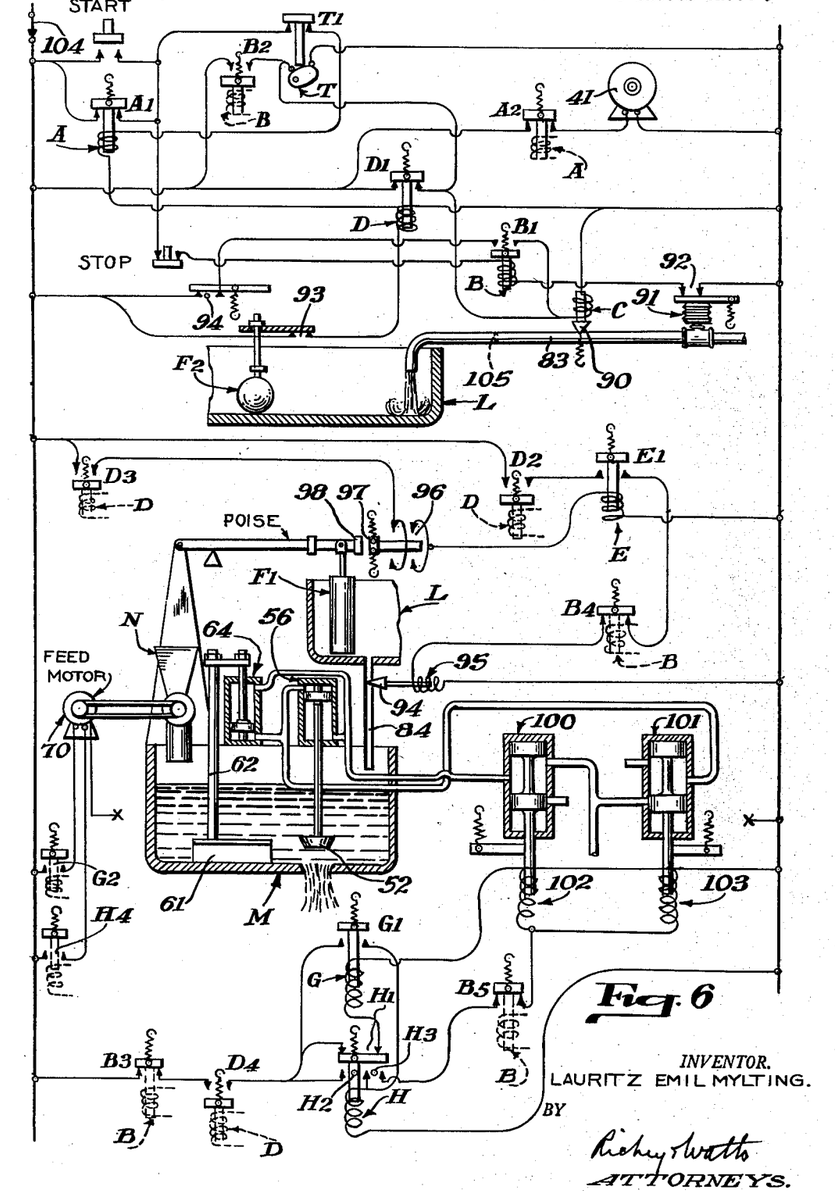

The following description of the operation of the device is made primarily with reference to the combination schematic wiring and mechanical diagrams of Figs. 4 to 6. By means of a circuit to be described presently, the liquid supply tank L is filled upon closing the main line or emergency switch S, which switch remains closed during normal operation of the system. Thus the liquid tank is always filled at the beginning of a cycle.

Fig. 4 shows the relays and contacts before the start button is actuated. The emergency switch 104 is normally kept closed and this insures that water tank L will normally be full before starting the drive motor. This is accomplished because the lines leading to the float-controlled contacts 93 and 94 that control the repeat cycle control relay D are energized independently of the motor start button. When the water tank is empty, lower contacts 93 are closed, energizing relay D and coil C of the water admission valve 90 through conatcts $D_1$. This circuit remains energized until contacts 93 are opened by the float when the tank is full. When the start button is closed, the solenoid A of the dust conditioner drive motor holding relay is energized by a circuit leading through the normally closed contacts $T_1$, the latter contacts being controlled by a water tank refilling timer T. Normally open contacts $A_1$ of relay A now close and since contacts $A_1$ are in parallel with the start button, they hold solenoid A energized. With relay A energized, normally open contacts $A_2$ close and the drive motor 41 starts, rotating the dust conditioner vat and the paddles 43.

As mentioned, the water tank will have been filled and further admission of water to the tank is prevented as follows: With relay A energized and holding contacts $A_1$ closed, a branch-holding circuit is established through the normally closed stop button, the coil of a circuit-holding relay solenoid B, and normally closed water-pressure controlled contacts 92, so that the coil of holding relay B is energized. In addition to the circuit to the solenoid C of the normally closed water inlet valve 90 through contacts $D_1$ previously described, there is a parallel circuit to the inlet valve solenoid. This is through the upper float-controlled contacts 94 and normally closed contacts $B_1$ of relay B, the latter relay having been energized so that contacts $B_1$ are open. At this time the first circuit is de-energized by float contacts 93 and the other by contacts $B_1$ of the holding relay so that the water inlet valve remains closed until a cycle is completed.

In order to insure continuous rotation of the mixing paddles and closure of the water inlet valve to tank L, the timer motor T is de-energized during the mixing phase of the cycle. This is accomplished as follows: Since holding relay B is energized, a pair of normally closed contacts $B_2$ are open, which de-energizes one of two parallel circuits leading to the timer motor T. The other circuit to timer motor T runs through contacts $D_1$ which are open at this time and remain open so long as float-controlled contacts 93 are open due to the presence of water in the tank. Thus, both circuits to the timer motor are de-energized and remain so until the water tank is emptied, or until circuit-holding relay B is de-energized.

The coil of the circuit-establishing relay B remain energized during normal operation, and can only be de-energized by the stop button, the timer, or a failure of water pressure.

Water is retained in the vapor tank L or admitted to mixing vat M by the normally closed water release valve 95, controlled by the following circuit: A normally closed contact $D_2$ of the repeat cycle control relay D (de-energized) is in series with a normally open contact $E_1$ of a poise switch relay E (controlled by the balance system), and in series with a normally open contact $B_4$ of the circuit-holding relay B (energized). These three contacts are all in series with the actuating solenoid of the water release valve 95. Although the aforesaid contacts $D_2$ and $B_4$ are closed at this time, the circuit to the water release valve is interrupted by the normally open contacts $E_1$ of poise-controlled relay E. The circuit to the poise relay E is de-energized at the beginning of the cycle as follows: When the water tank L is full and the mixing vat M empty, the balance weights are adjusted so that the poise-compensating float $F_1$ is in its neutral position with which a magnet 98 on the poise holds a contact operator 97 in such a position that double-acting contacts 96 of the magnetically-actuated mercury poise switch are open. Although normally closed contacts $D_3$ of the repeat cycle relay D (de-energized) are in the circuit to the poise relay E and are closed at this time, since contacts 96 in the same circuit are open, the circuit to poise relay E remains interrupted, and that relay is de-energized. As described above, so long as relay E is de-energized, the solenoid of the water admission valve 95 is de-energized and the valve is closed.

With the relays set as described, the mixing vat M is ready to receive ash or dust. The circuits to the dust delivery or feed motor 70 are arranged so that that motor is started as follows: It has been mentioned that circuit-holding relay B is energized, and with this, a pair of normally open contacts $B_3$ in the feed motor circuit are closed. Also, since the water tank is full, the repeat cycle control relay D is de-energized and a set of normally closed contacts $D_4$ in the feed motor circuit remains closed. In series with $B_3$ and $D_4$ are normally closed contacts $H_1$ of a motor-running circuit relay H, and the coil of a motor-starting relay G. A circuit is now established by which the coil of the motor-starting circuit relay G is momentarily energized through the aforesaid contacts $B_3$, $D_4$ and $H_1$. When relay G is energized this closes normally open contacts $G_2$ in the motor-starting circuit and the feed motor starts on its starting circuit.

As seen in Fig. 5, the running circuit for the feed motor is established as follows. As soon as starting relay G is energized, normally open contacts $G_1$ close, which energizes the solenoid of the running relay H and closes normally-open contacts $H_2$. Simultaneously, $H_3$ and $H_4$ close, whereas normally closed contacts $H_1$ open. The opening of contacts $H_1$ de-energizes the starting relay G and its contacts drop out, but contacts $H_2$ are holding contacts for the running relay H so that the latter remains energized and the running circuit of the feed motor is maintained through contacts $H_4$.

In the illustrated embodiment, double-acting, electrically-controlled valves 100 and 101 are provided for the plow and plug air cylinders and these valves are arranged so that before admission to vat M is initiated, the plow moves to its upper position and the plug to its lower position, closing the vat outlet. This occurs when the solenoids 102 and 103 that control these valves are energized. As seen in Fig. 5, these solenoids are energized at this time through normally open contacts $H_2$ as well as contacts $B_5$ of circuit-holding relay B, both relays having been energized to close those contacts.

As seen in Fig. 5, with the feed motor running, dust falls into the mixing vat M and the scale beam, which in effect weighs continuously the dust in the vat, is soon unbalanced. Poise switch 97 is now actuated by magnet 98 to close the pair of contacts 96 energizing poise relay E and closing its contacts $E_1$. The circuit to the water release valve solenoid 95 is now complete and water is admitted to the vat and mixed with the dust by the rotating vat and paddles. The weight of the water admitted to the vat tends to further lower the mixing vat and hence raise magnet 98, but this weight and the weight of the dust are compensated for by the decreased buoyant effect on float $F_1$ due to lowering the water level in tank L. It will be understood that the decrease in the buoyant effect of the water on the float is a measure of the quantity of water admitted. Since the float is suspended from the scale beam the latter can be said to measure or to weigh the quantity of water admitted to the vat. As water is admitted to the vat the float $F_1$ drops, the poise is rebalanced, contacts 96 open, and the water release valve closes. The dimension of float $F_1$ and the adjustment of the poise weights are such that for a given quantity of dust, a predetermined quantity of water is admitted before balance is restored, the ratio of water to dust being a predetermined effective ratio for obtaining a uniform mix without waste of water.

The aforesaid steady admission of dust and the intermittent admission of water in definite proportion continues until the water tank L is emptied. It is now necessary to stop the rotary feeder, empty the mixture from vat M, and refill the water tank. As seen in Fig. 6, these actions are initiated when float $F_2$ drops to its lower position. This closes the lower float-controlled contacts 93, energizes the repeat cycle control relay D, and causes water inlet valve solenoid 95 to be energized through contacts $D_1$, admitting water to tank L.

Means are provided to insure that the water release valve remains closed regardless of the scale beam position during the time that the water tank L is being filled. Since the float-controlled relay D is energized during filling, normally closed contacts $D_2$ and $D_3$ in the circuits controlling water release valve solenoid 95 are open, and the normally closed water release valve remains closed regardless of the position of the poise switch.

Of course the dust feed motor is stopped when the water tank empties. It can be seen in Fig. 6 with the tank empty, the float-controlled repeat cycle control relay D is energized, which opens normally closed contacts $D_4$ in the feed motor circuit. The coil of running circuit relay H is now de-energized, and normally open contacts $H_4$ drop out, stopping the feed motor.

As seen in Fig. 6, the mixture of dust and water is emptied from mixing vat M. This is because with relay H de-energized, normally open contacts $H_3$ are open, de-energizing the valve-controlling solenoids 102 and 103. This causes the spring-loaded valves 100 and 101 to move upwardly in the figure, with which the plug is raised and the plow lowered to discharge the mixture of dust and water from the mixing vat V.

As water enters to fill the tank L, float $F_2$ rises and when that tank is full switch 93 is snapped open, de-energizing the repeat cycle relay D. Now contacts $D_1$ opens, breaking the circuit to the water inlet valve solenoid and causing that valve to close. Also, with relay D de-energized, normally closed contacts $D_4$ in the circuit to the plug and plow valves and the feed motor close, the plow is raised, the plug lowered, and the feed motor 70 is started as previously described. Control of the water release valve is also returned to the poise-controlled switch by contacts $D_2$ and $D_3$, which close when relay D is de-energized. After float-controlled contacts closed when the tank emptied, relay D became energized and started the timer motor through contacts $D_1$. If the tank has not filled after elapse of the timer period, the timer opens contacts $T_1$ and de-energizes relays A and B. This de-energizes both the drive and feed motors.

In order to shut down the unit the stop button is pushed and latched open. However, means are provided to cause the mixer drive motor to continue to run for a given length of time after the stop button has been so pushed, in order that the paddles and mixer vat will continue to rotate and agitate the mixture until the entire batch is discharged. This is accomplished by maintaining the circuit through relay A that controls the drive motor contacts $A_2$, for a predetermined period of time, it being noted that this circuit is unaffected by the stop button and is normally opened only by the timer. The motor driven timer T does not open normally closed contacts T₁ in the circuit of holding relay A before the elapse of a certain predetermined time after the water tank has emptied, this time being normally ample for the refilling of the water tank. After elapse of this time, the timer motor opens contacts T and relay A is de-energized, thereby stopping the drive motor.

If it is desired to stop a cycle before its completion and with water in the tank, the stop button is pushed and held in, relay B is de-energized, and normally closed contacts B₂ close, energizing the other circuit to the timer motor. De-energization of relay B also opens the circuit to the normally closed water-release valve (contacts B₄) as well as to the feed motor, plow, and pump controls (contacts B₃ and B₅), causing the water-release valve to close, the feed motor to stop, the plow to lower, and the plug to rise and open the vat outlet. Simultaneously, normally closed contacts B₁ close, and since the tank is partially empty and float F₂ lowered, float-controlled contacts 94 are also closed, establishing a circuit to the water inlet valve 90. The water inlet valve now opens to refill tank L, ready for the next batch. When the water tank is filled, float F₂ rises and opens normally closed contacts 94 in series with the water inlet valve, closing the inlet valve. However, the mixer motor continues to rotate the vat and paddles until the timer period elapses with which the timer motor opens contacts T₁ to release holding relay A. The period is adjusted so that by this time the vat will be completely emptied.

It is important that the water tank L is completely refilled before operation of the unit is resumed, in order to maintain the proper water to dust ratio in the next batch. Accordingly, the period of the timer is set so that it exceeds the time normally required to fill the water tank. The refill time is controlled by an orifice 105 in the inlet line, or by other means regulating the inlet flow.

Once the timer opens contacts T₁, the operator cannot regain control of the normal mixing circuits with the start button until the water tank L has filled. Opening of contacts T₁ by the timer de-energizes relay A and then relay B, and all operating circuits in the system except that to the timer motor are open. Under these conditions, even though the start button is pushed, the unit will not start because the timer motor holds open contacts T₁, and control is not restored to the start button until the water tank L is filled.

One form of timer that may be employed is the type, well known in the art, wherein a motor closes the contacts against the force of a spring and holds them closed after elapse of the timer period so long as the motor remains energized. When the motor is de-energized (as it is when the tank L is full and the float opens contacts 93) the motor is de-energized, the contacts spring open and the timer automatically resets itself, restoring control to the start button.

Incorporated in the control is an emergency switch 104 to control power to all of the aforesaid circuits. This switch should normally be left in the "On" position in order that the timer motor may remain energized in case the water tank is not refilled. However, it can be used for an emergency stop if required. If an emergency stop is required at any time, the power should be turned on again as soon as possible, the start button pushed and then the stop button pushed to the "Stop" position and turned to hold. This manual procedure will energize the relay A and hence the mixing motor, but all other relays and solenoids will be de-energized to discharge the portion of the batch formed up to the time of the emergency stop and reset the control mechanism.

Periodically the dust conditioner will have to be adjusted to compensate for the "caking" that occurs on the interior of the mixing drum or chamber. To do so, the unit should be empty and the water tank filled to the high-water level. The scale beam will probably be up or in the overbalanced position. This is brought back into balance by placing buckshot in the proportion control float at the outboard end of the beam for the major adjustment and the fine adjustment can be made on the balance ball mounted on top of the inboard end of the beam.

Various modifications in the design of the apparatus may be made without altering the mode of operation of the device. For example, the plug and plow could be linked together mechanically and actuated by one air cylinder. Also, a pump system could be employed to replace the flow control orifice 105 in the water inlet line 83 for the tank L. Although I have described a preferred embodiment of the invention in connection with a system for conditioning fly ash or dust precipitated in furnace installations, it will be apparent that the principles of the invention may be employed in connection with the conditioning of many other types of fine or impalpable dusts encountered in industry and presenting disposal problems. Accordingly, I contemplate that the appended claims and not the preferred embodiment of the invention described in this specification be determinative of the scope of the invention.

I claim:

1. Apparatus for mixing dust and water for disposal purposes, comprising a mixing vat, a scale beam and means suspending said vat therefrom, agitator means for said vat, means for admitting dust to said vat, a water tank, means to fill the tank with a predetermined quantity of water, a conduit to conduct water from the tank to the mixing vat, a valve in said conduit, a float suspended from said scale beam and buoyant in the water in said tank, and control means for said water release valve actuated by the position of said scale beam and float.

2. Apparatus for mixing dust and water for disposal purposes, comprising a mixing vat, a scale beam, means suspending said vat from one arm thereof, agitator means for said vat, means for admitting dust to said vat, a water tank, a conduit to fill the tank with water, a conduit to conduct water from the tank to the mixing vat, a water-release valve in said conduit, a float suspended from the other arm of said scale beam and buoyant in the water in said tank, and control means for said water release valve actuated by the position of said scale beam and float, said scale beam and control means being arranged so that an increase in weight of the mixing vat tends to cause said water-release valve to open whereas the falling of the water level in the tank tends to cause it to close.

3. Apparatus for mixing dust and water for disposal purposes, comprising a mixing vat, a scale beam, means suspending said vat from one arm thereof, agitator means for said vat, means for admitting dust to said vat, a water tank, a conduit to fill the tank with water, a conduit to conduct water from the tank to the mixing vat, a water release valve in said conduit, a float suspended from the other arm of said scale beam and buoyant in the water in said tank, and control means for said water release valve actuated by the position of said scale beam and float, said scale beam and control means being arranged so that an increase in weight of the mixing vat tends to cause said water release valve to open whereas the falling of the water level in the tank tends to cause it to close, a valve in said tank-filling conduit, means to close said valve when the tank is full, and means to open said valve when the tank is empty.

4. Apparatus for mixing dust and water for disposal purposes, comprising a mixing vat, a scale beam, means suspending said vat from one arm thereof, agitator means for said vat, means for admitting dust to said vat, a water tank, a conduit to fill the tank with water, a conduit to conduct water from the tank to the mixing vat, a water-release valve in said conduit, a float suspended from the other arm of said scale beam and buoyant in the water in said tank, and control means for said water-release valve actuated by the position of said scale beam and float, said scale beam and control means being arranged so that an increase in weight of the mixing vat tends to cause said water-release valve to open whereas the falling of the water level in the tank tends to cause it to close, a valve in said tank filling conduit, means to close said valve when the tank is full, and means to open said valve when the tank is empty, a motor to drive said agitator means, and a timer for de-energizing said motor after elapse of a period of time normally adequate for refilling said tank.

5. Apparatus for mixing dust and water for disposal purposes, comprising a mixing vat, a scale beam and means suspending said vat therefrom, agitator means for said vat, means for admitting dust to said vat, a water tank, means including a valve to fill the tank with a predetermined quantity of water, a conduit to conduct water from the tank to a mixing vat, a release valve in said conduit, a float suspended from said scale beam and buoyant in the water in said tank, control means for said water-release valve actuated by the position of said scale beam and float, cycling means associated with said water tank comprising control means for stopping all admission to the vat and opening the tank-fill valve when the tank empties, and control means for closing the tank-fill valve and initiating admission to the tank when the tank is refilled with said predetermined quantity of water.

6. Apparatus for mixing dust and water for disposal purposes, comprising a mixing vat, a scale beam and means suspending said vat therefrom, agitator means for said vat, means for admitting dust to said vat, a water tank, means to fill the tank with a predetermined quantity of water, a conduit to conduct water from the tank to the mixing vat, a release valve in said conduit, a float suspended from said scale beam and buoyant in the water in said tank, control means for said water-release valve actuated by the position of said scale beam and float, a second float bouyant in said water tank, control means actuated by said second float for stopping all admission to said vat and refilling the tank when the tank empties, and control means actuated by said float to stop water admission to said tank after said predetermined quantity of water has flowed into the tank.

7. Apparatus for mixing a material with a liquid in definite proportion comprising a mixing vat, a scale beam and means suspending said vat therefrom, agitator means for said vat, means for admitting one material to said vat at random, a liquid tank, means to fill the tank with a predetermined quantity of liquid, a conduit to conduct liquid from the tank to the mixing vat, a valve in said conduit, a float suspended from said scale beam and buoyant in the liquid in said tank, means for opening said valve to admit liquid from the tank to the vat when the float is lifted from a neutral position by said scale beam, and means to close said valve when said float drops to its neutral position due to draining of liquid from the tank, whereby the position of said float is a function of the proportion of said materials.

8. Apparatus for mixing a material with a liquid in definite proportion comprising a mixing vat, agitator means for said vat, means for admitting the material to said vat at random, means to admit liquid to the vat, means to weigh the mixture in the vat, means to measure the weight of liquid admitted, means to compare the total weight of the mixture with the weight of the liquid admitted, and means to regulate the quantity of liquid admitted on the basis of said comparison, and means to indicate when the weight of liquid admitted is a predetermined fraction of the total weight of material and liquid admitted.

9. The method of mixing material with a liquid in a predetermined proportion comprising the steps of counter-balancing a vat, filling a tank with a predetermined quantity of liquid, increasing the counter-balance of the vat in response to removal of liquid from the tank, admitting material to the vat thereby upsetting the balance of the vat, and restoring the initial balance of the tank by admitting tank liquid to the vat.

10. The method of mixing a batch of powdered material and liquid in a predetermined proportion comprising the steps of counter-balancing a vat, filling a tank with a predetermined quantity of liquid, increasing the counter-balance of the vat in response to removal of liquid from the tank, admitting powdered material to the vat thereby upsetting the balance of the vat, restoring the initial balance of the tank by admitting tank liquid to the vat, and agitating the mixture during the process.

11. Apparatus for mixing material with a liquid in a predetermined proportion comprising a vat, a weight-responsive mounting for said vat, means for admitting the material to the vat, means connected with said vat that moves in one direction when material is admitted to the vat, a liquid supply tank, means for measuring the level of liquid in said tank, means for admitting liquid from the tank to the vat, said vat-connected means returning toward its initial position when liquid is removed from the tank, said vat-connected means being responsive to the amount of liquid removed from the tank, and means for stopping liquid admission when the vat-connected means returns to its initial position.

12. Apparatus for mixing material with a liquid in a predetermined proportion comprising a counter-balanced vat, a liquid supply tank, control means for increasing the counter-balance of the vat as liquid is removed from the tank, means for admitting the material to the vat thereby upsetting the balance of the vat, means for admitting liquid from the tank to the vat and simultaneously increasing the counter-balance to restore the initial balance of the vat, and means for sensing vat balance and stopping liquid admission when initial vat balance is restored.

LAURITZ EMIL MYLTING.

REFERENCES CITED

The following references are of record in the file of this patent:

UNITED STATES PATENTS

| Number | Name | Date |
|---|---|---|
| 808,599 | Crichfield | Dec. 26, 1905 |
| 1,334,395 | Patterson | Mar. 23, 1920 |
| 1,501,578 | Zepp | July 15, 1924 |
| 1,704,268 | Venable | Mar. 5, 1929 |
| 1,969,533 | Pipes et al. | Aug. 7, 1934 |
| 2,109,534 | Johnson | Mar. 1, 1938 |